United States Patent [19]
Nelson

[11] Patent Number: 4,726,257
[45] Date of Patent: * Feb. 23, 1988

[54] BALANCED STEERABLE TRANSMISSION

[76] Inventor: Donald F. Nelson, 7560 Kentwood Ct., Gilroy, Calif. 95020

[*] Notice: The portion of the term of this patent subsequent to Oct. 28, 2003 has been disclaimed.

[21] Appl. No.: 843,013

[22] Filed: Mar. 24, 1986

Related U.S. Application Data

[63] Continuation-in-part of Ser. No. 463,479, Feb. 3, 1983, Pat. No. 4,619,158, which is a continuation of Ser. No. 153,177, May 27, 1980, abandoned.

[51] Int. Cl.⁴ ............................................. F16H 37/06
[52] U.S. Cl. ....................... 74/695; 74/682; 74/694; 74/710
[58] Field of Search ............ 74/665 K, 665 M, 665 L, 74/665 P, 665 R, 750 R, 695, 705, 674, 710, 664, 740, 380, 385, 417, 797, 799, 682; 440/57, 58, 75, 900; 415/122 R; 416/170 R

[56] References Cited

U.S. PATENT DOCUMENTS

| | | | |
|---|---|---|---|
| 1,300,118 | 4/1919 | Carter et al. | 74/710 |
| 1,382,289 | 6/1921 | Janicki | 74/695 |
| 1,384,839 | 7/1921 | Krohn | 74/695 |
| 1,537,434 | 5/1925 | Gould | 74/695 |
| 1,903,350 | 4/1933 | Landrum | 440/75 |
| 1,954,686 | 4/1934 | Stickney | 74/695 |
| 2,149,320 | 3/1939 | Szekely | 74/682 |
| 2,755,765 | 7/1956 | Wanzer | 74/385 |
| 2,783,661 | 3/1957 | Dryer | 74/695 |
| 3,094,967 | 6/1963 | Willis | 74/682 |
| 3,486,478 | 12/1969 | Halliday | 115/35 |
| 3,492,966 | 2/1970 | Kiekhaeffer | 440/75 |
| 3,750,616 | 8/1973 | Nelson | 115/35 R |
| 3,851,614 | 12/1974 | Nelson | 115/35 |

FOREIGN PATENT DOCUMENTS

| | | | |
|---|---|---|---|
| 1023337 | 1/1958 | Fed. Rep. of Germany | 74/695 |
| 806628 | 9/1936 | France | 74/799 |
| 859573 | 6/1940 | France | 74/710 |
| 1007488 | 6/1952 | France | 74/695 |
| 2356061 | 12/1975 | France | 74/750 R |

*Primary Examiner*—Leslie Braun
*Assistant Examiner*—Dwight G. Diehl
*Attorney, Agent, or Firm*—Christie, Parker & Hale

[57] ABSTRACT

This power transmission has a steerable sleeve mounted for pivoting about an axis coaxial with the output shaft of the transmission. The steerable sleeve can be pivoted in either direction with equal torque regardless of rotation of the output shaft. The output shaft has two output gears. Two gear drive trains that are substantially the same interconnect the input shaft to the two output gears of the transmission. In an exemplary embodiment the first drive train includes a ring gear driven by the input shaft, at least one planetary gear, and a sun gear which is the first output gear on the output shaft. The second drive train has a ring gear driven in the opposite sense of rotation from the first ring gear, at least one planetary gear and a transfer gear face substantially the same as the first output gear. The transfer gear is connected to a reversing gear assembly on the steerable sleeve so that torque is applied to the second output gear on the shaft. The two planetary gears are interconnected by a spider which is free to pivot and compensate for motion of the steerable sleeve. The spider assures that advance of one planetary gear drive equals recession of the other planetary gear drive. Since the two drive trains are equivalent and contra-rotating, torques are balanced.

31 Claims, 9 Drawing Figures

BALANCED STEERABLE TRANSMISSION

CROSS-REFERENCE TO RELATED APPLICATIONS

This application is a continuation-in-part of U.S. patent application Ser. No. 463,479 filed Feb. 3, 1983, now U.S. Pat. No. 4,619,158 which is a continuation of U.S. patent application Ser. No. 153,177, filed May 27, 1980, now abandoned.

FIELD OF THE INVENTION

This invention concerns a power transmission having a steerable sleeve independent of the input and output drives. The transmission has two contra-rotating drive trains between the input and output shafts, which permits steering the sleeve in either direction with equal torque.

BACKGROUND OF THE INVENTION

This invention comprises an improvement over balanced steerable power transmissions disclosed in my U.S. Pat. Nos. 3,750,616 and 3,851,614. The subject matter of the aforementioned patents and applications is hereby incorporated by reference.

In the steerable transmissions of the above-identified patents there are input and output shafts with the output shaft mounted in a housing which is steerable. This permits the direction of the output shaft to be changed independently of the direction of rotation of the input shaft. Such an arrangement can be used, for example, for steering a boat, thereby gaining benefits of both an inboard and an outboard arrangement. These transmissions can be somewhat cumbersome and have appreciable drag since a large housing is rotated.

It is desirable to provide an arrangement where the transmission housing is essentially fixed and a steerable sleeve or the like can be pivoted about an axis coaxial with the output shaft. This permits a relatively smaller structure to be pivoted. It is desirable that the sleeve be steerable with substantially no net torque; that is, with essentially the same torque required to pivot the sleeve in either direction, regardless of the direction or speed of rotation of the output shaft.

This not only makes the steerable transmission quite suitable for use in small boats, it can significantly increase the fields in which the transmission is useful. It can be employed in land and air vehicles, construction equipment, wind generators, and a broad variety of other applications limited only by the ingenuity of the user.

It can be desirable to minimize the size of the transmission and to provide means for steering embodied in the transmission instead of operating on an external mechanism. It is also desirable to maintain symmetry of the parts used for building the transmission for minimizing the type of parts stocked to provide economies of scale in purchasing or making parts. It is also desirable to be able to readily adapt the transmission in manufacture to provide different gear ratios between the input and output.

BRIEF SUMMARY OF THE INVENTION

There is, therefore, provided in practice of this invention according to a presently preferred embodiment a balanced steerable power transmission having a stationary housing and input and output shafts through which power is transmitted. A steerable sleeve is mounted concentric with what can be considered the output shaft. There is a first drive train coupling the input shaft to a first gear on the output shaft. A second drive train similar to the first drive train and rotating in the opposite direction couples the input shaft to a second gear on the output shaft. A spider is mounted for pivoting in the housing and coupled to both drive trains for advancing one drive train an amount equal to recession of the other drive train in coordination with pivoting of the sleeve so that there is not net rotational force on the sleeve due to the drive trains when the input shaft is rotatably driven; that is, the sleeve can be steered or pivoted in either direction with equal torque regardless of rotation of the shafts.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
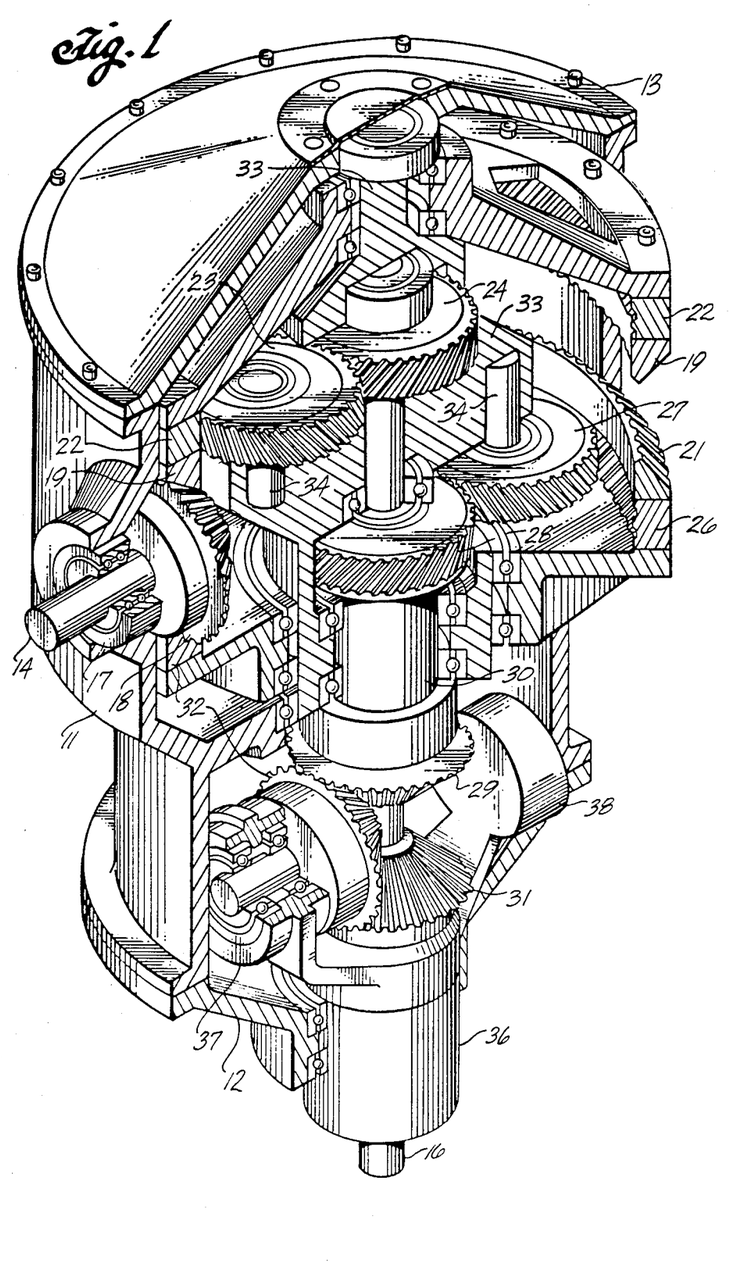
FIG. 1 illustrates in slightly schematic perspective cutaway a balanced steerable transmission constructed according to principles of this invention.
Figure 2:
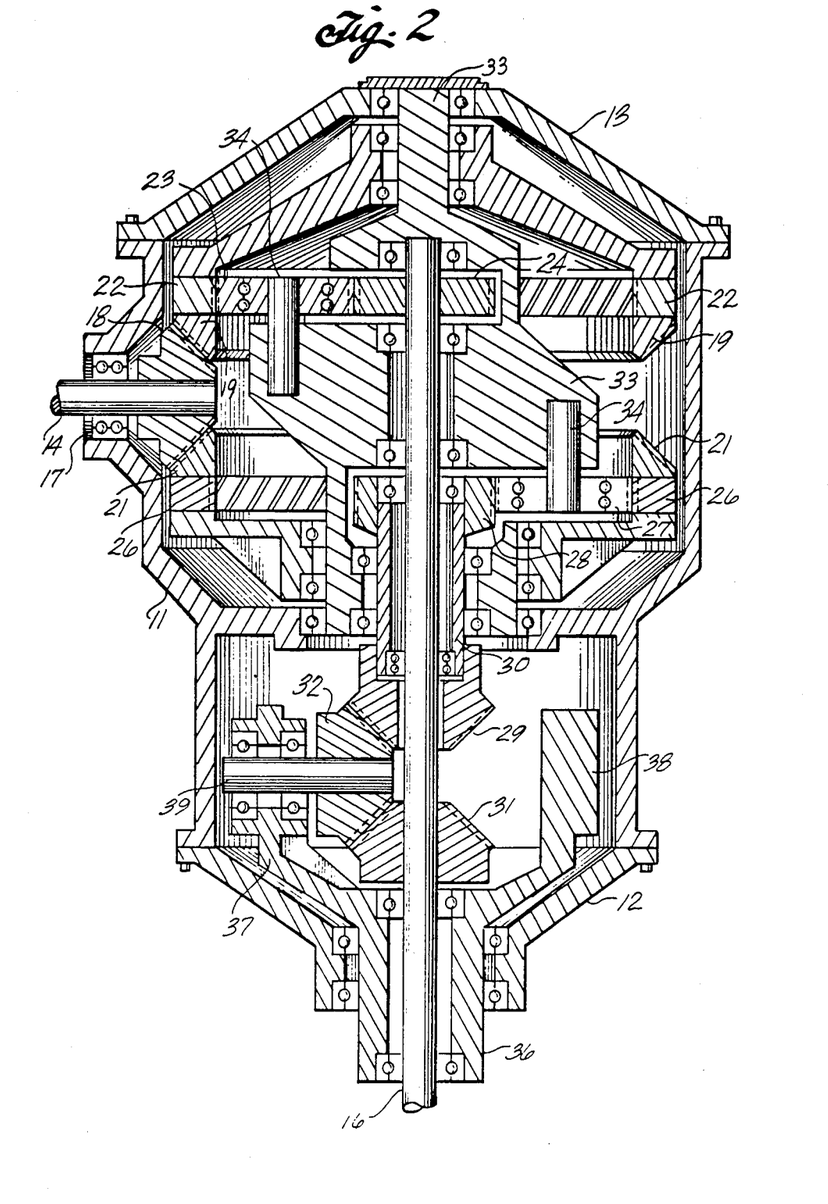
FIG. 2 is a schematic longitudinal cross section through the transmission.

One embodiment of the balanced steerable power transmission is illustrated somewhat schematically in the longitudinal cross section of FIG. 2, and in a perspective view with portions of the housing and internal mechanisms cut away in FIG. 1. As illustrated in these views, the housing of the transmission comprises a main casing 11 closed at the bottom by a lower cover 12 and at the top by an upper cover 13. An input shaft 14 enters one side of the main casing 11. An output shaft 16 extends through the lower cover 12 coaxial with the housing of the power transmission which is essentially circular in transverse cross section. The output axis is perpendicular to the input axis.

As used herein, the designations of top and bottom of the transmission are used with respect to the drawings in FIGS. 1 and 2. This is done for convenience in the description and there is no relation to the orientation of the transmission in service. In practice the transmission can be oriented in any direction.

Also for convenience in description, one of the shafts 14 is referred to as the input shaft and the other shaft 16 is called the output shaft. These roles can be reversed with power applied to the "output" shaft and a driven member connected to the "input" shaft. Thus, within this specification and accompanying claims, "input," "output," "upper," "lower," and the like are employed for clarifying the members referred to and are not words of limitation. In general, "input" could be read "output" and vice versa.

The input shaft 14 is journalled in the main casing 11 by ball bearings 17 or the like. Various other members in the transmission are also mounted by ball bearings indicated schematically in the drawings and, in general, these are not further referred to in this description since conventional in nature. It will also be apparent that grease seals and the like are employed at the openings through which shafts pass. Various bolts, snap rings, and similar conventional devices have also been omitted from the drawings for clarity.

An input bevel gear 18 is fixed on the input shaft 14. The input bevel gear meshes with an upper bevel ring gear 19 and a lower bevel ring gear 21, both of which are coaxial with the output shaft 16. Because of meshing with opposite sides of the input bevel gear, the ring gears are driven in contra-rotation.

The upper bevel ring gear is secured to an upper helical ring gear 22. The upper helical ring gear meshes with an upper planetary gear 23 which also meshes with an output sun gear 24 secured on the output shaft 16. Thus, input torque is coupled from the input shaft to the output shaft by way of the input bevel gear 18, upper bevel ring gear 19, upper helical ring gear 22, upper planetary gear 23, and output sun gear 24.

The lower bevel ring gear 21 is secured to a lower helical ring gear 26. The lower helical ring gear meshes with a lower planetary gear 27, which in turn meshes with a transfer sun gear 28 coaxial with the output shaft. The transfer sun gear is secured to a transfer bevel gear 29 by a transfer sleeve 30. This transfer gear assembly is coaxial with the output shaft 16 and journalled to the direction of rotation of the output shaft. The two planetary gear drive trains are substantially the same; that is, the pitch diameters of the gears are similar so that corresponding gears run at the same speeds.

An output bevel gear 31 is secured on the output shaft 16 opposite the transfer bevel gear 29. A common bevel gear 32 meshes with both the transfer bevel gear 29 and the output bevel gear 31. The transfer bevel gear and the output bevel gear on the shaft are substantially the same so there is no speed change. The transfer bevel gear and output bevel gear rotate in opposite senses of rotation. The common bevel gear reverses the sense of rotation of the output shaft and the output sun gear.

Thus, power is also coupled from the input shaft to the output shaft by a second drive train. This drive train comprises, seriatim, the input bevel gear 18, the lower bevel ring gear 21, the lower helical ring gear 26, the lower planetary gear 27, the transfer sun gear 28, transfer sleeve or tube 30, the transfer bevel gear 29, the common bevel gear 32, and the output bevel gear 31 secured on the output shaft.

A spider 33 is mounted in the housing for pivoting about an axis coaxial with the output shaft. For ease of understanding in the drawings, the spider is illustrated as if it were a single integral member. It will be understood, however, that the spider is assembled from a plurality of components which permit machining and assembly of the components. Suggestive of this assembly from component parts is the illustration of shafts 34 pressed into the main body of the spider to provide journals for the upper and lower planetary gears 23 and 27. The complex geometry of the spider is no disadvantage since it does not rotate at substantial speed, and precise balance is therefore unnecessary.

The spider 33 is journalled in the main casing 11 and cover 12 for pivoting coaxial with the output shaft. The spider in turn provides journalling support for the upper and lower ring gears and journalling support that stiffens the output shaft. The principal purpose of the spider, however, is to provide journalling support for the upper and lower planetary gears which are mounted on opposite faces of the spider and on diametrically opposite sides of the output shaft. The axes of rotation of the planetary gears are parallel to the output axis, The spider assures that the two planetary gears precess together within the respective helical ring gears.

A steerable or pivotable sleeve 36 is journalled in the lower cover 12 coaxial with the output shaft. In this embodiment the sleeve 36 comprises a Y-shaped yoke having a gear mounting arm 37 and a counterbalance arm 38. The common bevel gear 32 is mounted on a shaft 39 journalled in the gear mounting arm for rotation about an axis normal to the axis of the output shaft. If desired, a second common bevel gear can be mounted on the yoke in lieu of the counterbalance arm for engaging the output bevel gear and the transfer bevel gear. Such an arrangement balances thrust as well as weight.

The steerable sleeve 36 can be pivoted in either a clockwise or counterclockwise sense relative to the housing, independently of rotation of the output shaft. The two drive trains couple the input shaft to the output shaft so that there is no net rotation force on the yoke due to the drive trains as the input shaft is rotatably driven; that is, the steerable sleeve can be pivoted in either sense with equal torque regardless of input and output shaft rotation. The balancing of the torques in opposite directions is accomplished by precession of the spider in coordination with pivoting of the steerable sleeve and contra-rotation of the planetary gear systems.

Assume that the steerable sleeve is pivoted so that the left side in the illustration of FIG. 2 comprising the gear mounting 37 tends to move out of the plane of the drawing and the right side comprising the counterbalance arm 38 tends to move into the plane of the drawing. Assume further that for an instant the input and output shafts and the drive trains therebetween are stationary. Pivoting of the sleeve would therefore tend to move the common bevel gear 32 out of the plane of the drawing and because of gear meshing would tend to rotate the transfer gear assembly with its left side coming out of the plane of the drawing and the right side receding into the plane of the drawing.

To accommodate rotation of the transfer gear assembly the face of the lower planetary gear 27 in engagement with the transfer sun gear 28 also tends to recede into the plane of the drawing. Since the ring gear 26 is considered stationary, the entire rotational axis of the lower planetary gear tends to recede into the plane of the drawing. This, of course, is fixed to the spider 33 and makes the rotational axis of the upper planetary gear 23 tend to move out of the plane of the drawing. The spider thus coordinates precession of the planetary gears. The torque required to pivot the steerable sleeve and spider is equal in either sense of rotation since the two ring gears 22 and 26 are rotating in opposite directions, as are the corresponding sun gears 24 and 28. In effect, one planetary gear drive recedes by an amount equal to advance of the other planetary gear drive in response to pivoting of the steerable yoke.

Figure 3:
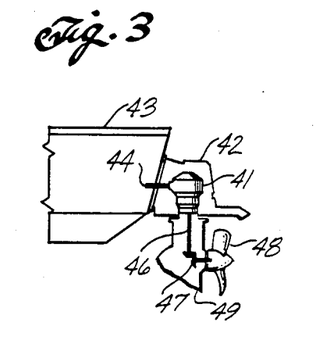
FIG. 3 is a fragmentary view indicating application of a steerable transmission in an inboard-outboard arrangement for a boat.

FIG. 3 is a fragmentary view illustrating an application of the balanced steerable transmission in an inboard-outboard boat arrangement. In this embodiment the transmission 41 is mounted in a housing 42 on the transom of a boat 43. The input shaft 44 to the transmission is connected to an inboard motor (not shown). The output shaft 46 is connected by way of a pair of bevel gears 47 to the propeller 48 for driving the boat. The propeller is mounted on a streamlined housing 49 connected to the steerable sleeve of the transmission. Thus, the streamlined housing and propeller can be pivoted as desired for driving and steering the boat. Since the power transmission is balanced as hereinabove described, pivoting of the housing in either direction requires equal force.

Figure 4:
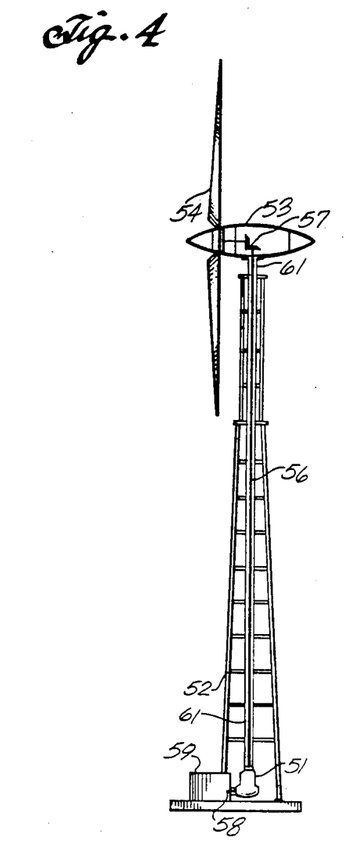
FIG. 4 illustrates application of a steerable transmission in a wind generator.

FIG. 4 illustrates another application of a balanced steerable transmission indicating the equivalence of the "input" and "output" shafts insofar as which of the two shafts is driven and which one provides the driving force. In this embodiment, what has been designated the "output" shaft for purposes of exposition is driven, whereas what has been designated the "input" shaft does the driving external to the tansmission.

FIG. 4 is a semi-schematic view of a wind generator incorporating a balanced steerable transmission 51. The transmission is at the base of a tower 52 on top of which is pivotally mounted a hub assembly 53. A large diameter propeller 54 is mounted on the hub to be driven by the wind. The propeller is connected to the "output" shaft 56 of the transmission by bevel gears 57. The "input" shaft 58 of the transmission is connected to an electric generator 59.

To generate electricity by the wind generator, it is desirable to keep the propeller aligned into the wind. The hub assembly 53 is therefore connected to the steerable sleeve 61 of the transmission. In this embodiment the sleeve 61 comprises an elongated tube running the height of the tower. Thus, the tube can pivot to maintain the hub assembly and propeller properly aligned with the wind direction, either in response to automatic weathervaning or a driven control system, and the torque required to turn the hub in either direction is equal regardless of propeller rotation.

Figure 5:
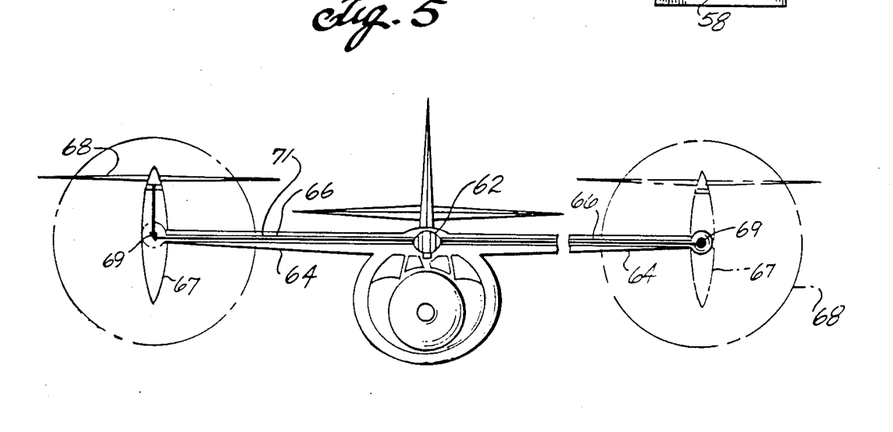
FIG. 5 illustrates application of a steerable transmission in a VTOL airplane.

FIG. 5 illustrates another application of a balanced steerable transmission as provided in practice of this invention. In this embodiment a transmission is employed in a vertical take-off and landing (VTOL) aircraft. A balanced transmission 62 is mounted in the fuselage of the airplane in line with the wings 64. The input to the transmission is fed by a power plant (not shown) in the fuselage of the aircraft. Two output shafts 66 extend from the transmission along the length of the wings. The transmission is essentially a pair of the transmissions hereinabove described and illustrated.

A pod 67 is mounted on the end of each wing 64. Each pod mounts a propeller 68 for driving the aircraft. In FIG. 5 the starboard pod is illustrated with its axis extending vertically so that the propeller can provide direct lift for the aircraft for take-off or landing. The port pod is illustrated with its axis extending horizontally so that the propeller drives the aircraft in its normal flight mode. The alternate positions of the pods and propellers are indicated in phantom.

Each of the output shafts 66 is connected to a propeller by bevel gears 69 in the pod so that the propeller is driven by the power plant in the fuselage. This permits use of a relatively small diameter pod at the wing tip. A tube 71 around each shaft connects the steerable sleeve of the transmission with one of the pods 67 for pivoting the pod between the horizontal and vertical positions. Each of the pods can be pivoted between such positions independently.

Many other applications of the balanced steerable power transmission will be apparent to those skilled in the art. Thus, for example, the power transmission can be mounted on a land vehicle with the output shaft and steerable sleeve extending vertical at each of a plurality of wheels. The wheels can then be steered by pivoting the steerable sleeve. Power can be applied to the wheels by way of the output shaft and all of the input shafts of such transmissions can be driven from a single power plant. Such an arrangement can be employed, for example, in an all-terrain vehicle where all four wheels are driven and are steerable.

Figure 6:
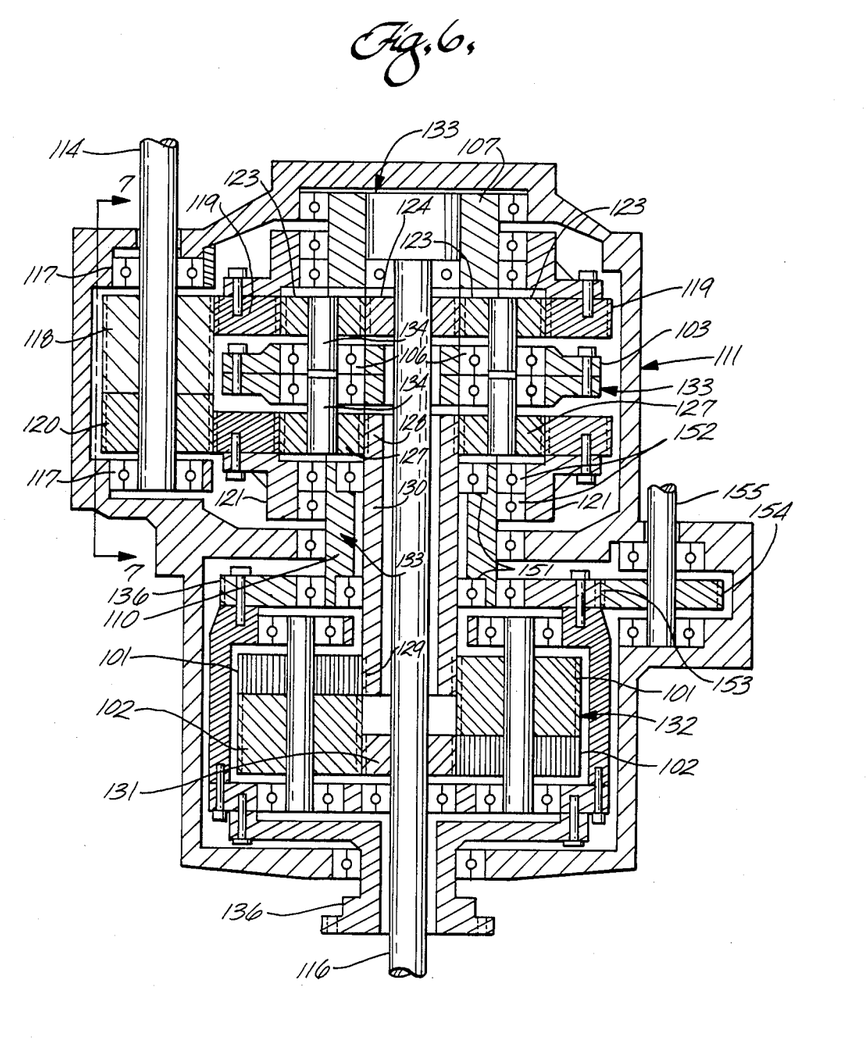
FIG. 6 illustrates schematically in a longitudinal cross section another embodiment of steerable transmission.

FIG. 6 illustrates another embodiment of the balanced steerable power transmission in a schematic longitudinal cross section. Since some of the parts of the transmission of FIG. 6 perform functions similar to some of the parts of the transmission of FIGS. 1 and 2, similarity of some of the reference numerals is used in the drawings. Where such similarity exists, the reference numeral used in FIG. 6 is 100 larger than the corresponding reference numeral in FIGS. 1 and 2. Thus, for example, the casing in FIG. 1 is identified with reference numeral 11 and the housing of the transmission in FIG. 6 comprises casing 111.

The casing 111 in this embodiment is also illustrated as an integral housing and it will be understood that it is assembled of various shells and covers bolted together. The housing of the power transmission is essentially circular in transverse cross section. An input shaft 114 enters one side of the main casing 111. An output shaft 116 extends through the lower end of the casing. In this embodiment, the output axis is parallel to the input axis.

The input shaft 114 is journalled in the main casing 111 by ball bearings 117 or the like. Various other members in the transmission are also mounted by ball bearings indicated schematically in the drawings in the same manner as the bearing 117 for the input shaft and, in general, these are not further referred to in this description since conventional in nature. It will also be apparent that grease seals and the like are employed at the openings through which shafts pass.

An input spur gear 118 is fixed on the input shaft 114. The input spur gear meshes with the external face of an upper ring gear 119 and with an input reversing spur gear 120. The input reversing spur gear meshes with the external face of a lower ring gear 121. Both of the ring gears are coaxial with the output shaft 116.

Figure 7:
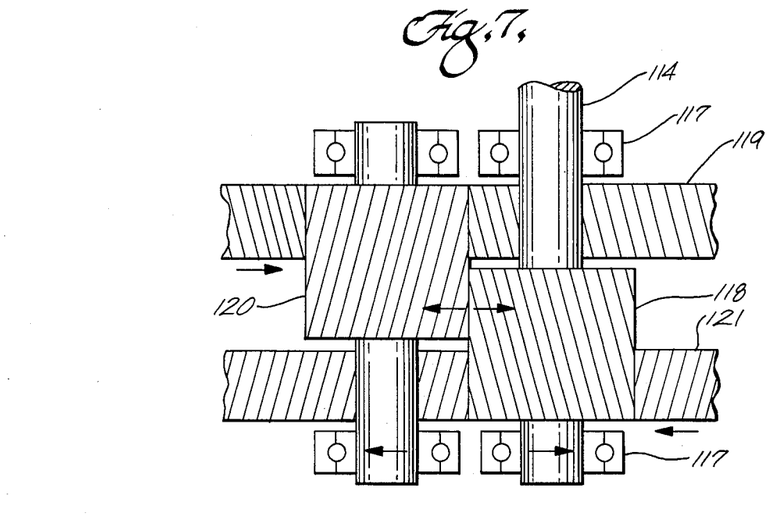
FIG. 7 is a fragmentary side view of a portion of the transmission of FIG. 6.

The arrangement of the input gears is indicated in the fragmentary semi-schematic view of FIG. 7. This view is a partial side view at line 7—7 in FIG. 6, showing only the input spur gear 118, input reversing spur gear 120, and upper and lower ring gears 119 and 121. The directions of rotation of the gears are indicated by arrows. The gears are shown as having helical teeth for clarity of illustration and it will be understood that either straight or helical teeth may be used as desired on any of the gears in this transmission.

The two spur gears each have faces longer than required for meshing with the respective ring gears. The extra length of these faces is used for meshing together. Thus, when the input spur gear 118 is driven in one direction, the reversing spur gear 120 is driven in the opposite sense of rotation. Since the upper ring gear 119 is driven directly by the input spur gear 118 and the lower ring gear is driven by the reversing gear 120, the ring gears are driven in contra-rotation. It will be apparent that the two input spur gears 118 and 120 need not have long faces to interengage, but could instead be pairs of gears mounted on the same shaft.

As an aide to understanding, each face of the gears in the drive trains in FIG. 6 is marked to indicate an exemplary direction of rotation. A circle with a dot in the center is used to indicate rotation out of the plane of the paper. A circle with a cross inside indicates rotation into the plane of the paper.

The upper ring gear 119 has an internal gear face as well as an external gear face. The inner face of the upper ring gear meshes with a pair of upper planetary gears 123 which also mesh with an output sun gear 124 secured on the output shaft 116. Thus, input torque is coupled from the input shaft to the output shaft by way of a first drive train comprising the input ring gear 118, upper ring gear 119, upper planetary gears 123, and output sun gear 124.

The lower ring gear 121 also has an internal gear face which meshes with a pair of lower planetary gears 127, which in turn mesh with a pair of lower planetary gears 127, which in turn mesh with a transfer sun gear face 128 coaxial with the output shaft. The transfer sun gear face has the same pitch diameter as the output sun gear so as to rotate at the same rate as the output sun gear. The transfer sun gear face is on a transfer tube or sleeve 130 which has a transfer gear face 129 at its opposite end. This transfer tube is coaxial with the output shaft 116 and journalled on either that shaft for rotation separate from rotation of the output shaft or, as illustrated, is journalled in a spider 133 described hereinafter.

An output spur gear 131 is secured on the output shaft 116 opposite the transfer gear face 129. The output spur gear has substantially the same pitch diameter as the transfer gear face. A reversing gear assembly 132 meshes with both the transfer gear face 129 and the output spur gear 131. The reversing gear assembly comprises a pair of driver spur gears 101 having gear faces meshing with the transfer gear face 129 on the transfer sleeve. The driver gear faces are long enough to also mesh with gear faces on a pair of driven spur gears 102. The arrangement is much like the reversing gears 118 and 120 at the transmission input. Thus, the driven gears 102 have the opposite sense of rotation from the driver gears 101. The driver gears mesh with the output spur gear 131. Thus, the transfer gear face 129 and output spur gear 131 rotate in opposite senses of rotation and at the same speed of rotation. This reversal of the sense of rotation by the reversing gear assembly means that both gears on the output shaft 116 rotate in the same direction while the ring gears driven by the input rotate in opposite directions.

Thus, power is also coupled from the input shaft to the output shaft by a second drive train. This drive train comprises, seriatim, the input gear 118, the input reversing spur gear 120, the lower ring gear 121, the lower planetary gears 127, the transfer sun gear face 128, the transfer gear face 129, the reversing gear assembly 132 (comprising the driver spur gears 101 and driver spur gears 102), and the output spur gear 131 secured on the output shaft.

Figure 8:
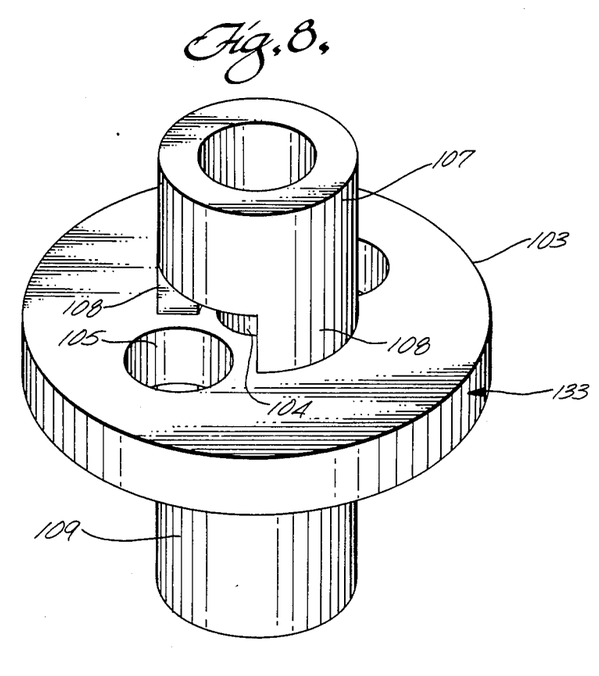
FIG. 8 is a schematic perspective view of the spider in the transmission of FIG. 6.

A spider 133 is mounted in the housing for pivoting about an axis coaxial with the output shaft. For ease of understanding which of the elements in FIG. 6 comprise the spider, it is also illustrated in a schematic perspective view in FIG. 8 as if were a single integral member. It will be understood, however, that the spider is assembled from a plurality of components which permit machining and assembly of the components. The drawing of the spider in FIG. 8 is not to scale nor are all of its details illustrated since that is unnecessary for an understanding of this invention.

The spider has a wheel-like central flange 103. The flange has a central hole 104 through which the output shaft passes. It also has a pair of diametrically opposite holes 105 in which bearings 106 are positioned to support shafts 134 on which the upper and lower planetary gears 123 and 127 are mounted (FIG. 6). An upper hub or sleeve 107 is connected to the flange by a pair of webs 108 (FIG. 8). A lower hub or sleeve 109 is connected to the flange by a pair of webs 110. The upper hub is journalled in the upper end of the casing. The lower hub is journalled in about the middle of the casing for pivoting coaxial with the output shaft. Inside the spider there are bearings 151 in which the transfer sleeve 130 rotates (FIG. 6). The spider also has bearings 152 on the outside on which the lower ring gear 121 rotates.

The principal purpose of the spider is to provide journalling support for the upper and lower planetary gears 123 and 127 which are mounted on opposite faces of the spider and on diametrically opposite sides of the output shaft. The axes of rotation of the planetary gears are parallel to the output axis. The spider assures that the two planetary gears precess together within the respective ring gears 119 and 121.

A steerable or pivotable sleeve 136 is journalled in the lower end of the casing coaxial with the output shaft. The generally cylindrical sleeve 136 provides mounting for the reversing gear assembly 132 on shafts 139 journalled for rotation about axes parallel to the axis of the output shaft.

In this embodiment steering is provided by driving the steerable sleeve within the transmission. A gear face 153 is provided at the upper end of the steerable sleeve. A steering gear 154 mounted on a shaft 155 meshes with the gear face. Thus, rotation of the steering gear shaft causes pivoting of the entire steerable sleeve. The steerable sleeve 136 can be pivoted in either a clockwise or counterclockwise sense relative to the housing with equal torque regardless of input and output shaft rotation just as in the embodiment of FIGS. 1 and 2. The balancing of the torque in opposite directions is accomplished by contra-rotation of the planetary gear drive trains and precession of the spider in coordination with pivoting of the steerable sleeve.

The embodiment of FIG. 6 can be advantageous since all of the gearing involves gears where the faces are parallel to the gear axes, rather than being bevel gears. This minimizes thrust loads on the shafts and need for stout thrust bearings.

Figure 9:
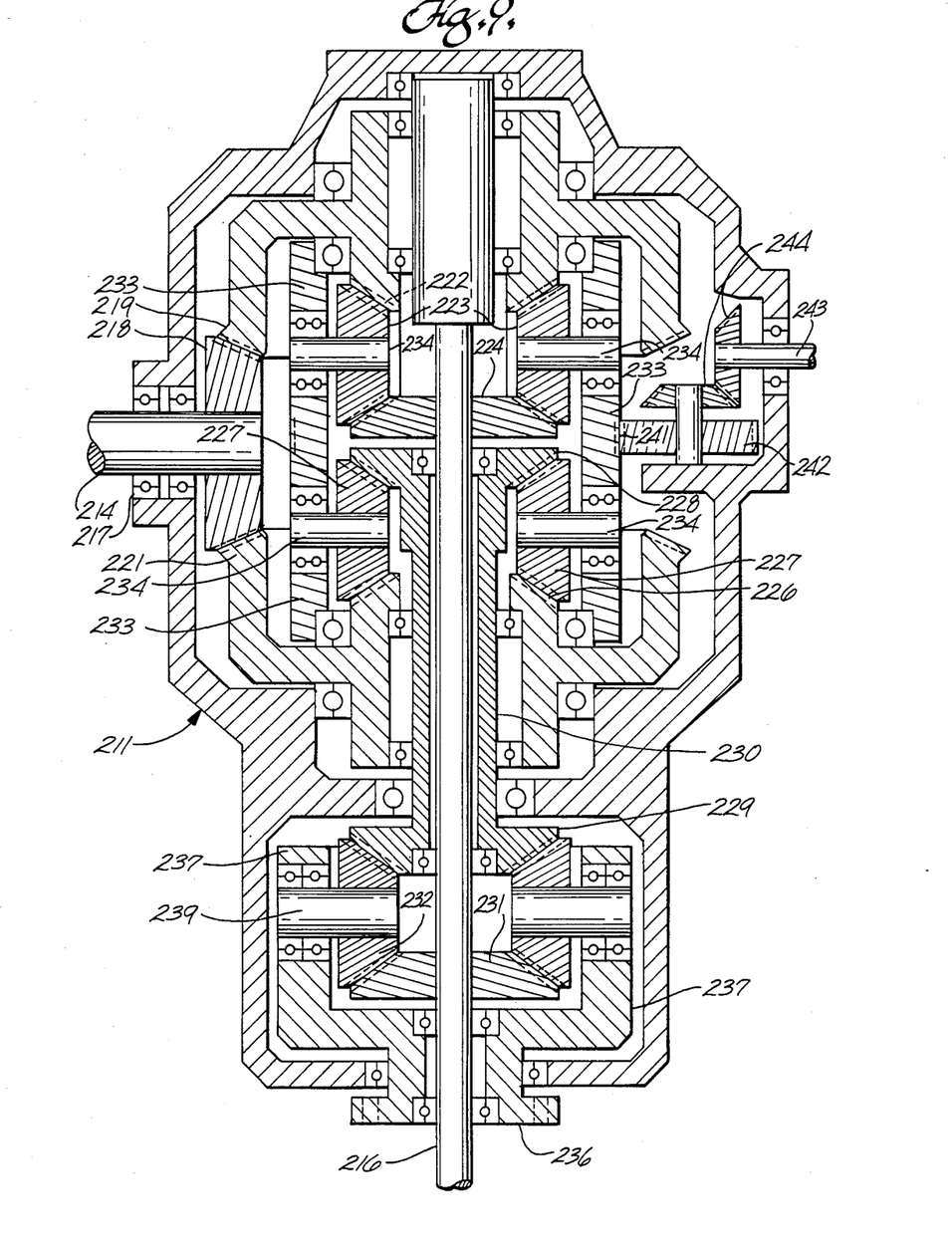
FIG. 9 is a schematic longitudinal cross section of another embodiment of steerable transmission.

Another embodiment of the balanced steerable power transmission is illustrated schematically in the longitudinal cross section of FIG. 9. Many of the parts in this embodiment function similarly to corresponding parts in FIGS. 1 and 2. Reference numbers 200 larger than the corresponding numerals in FIGS. 1 and 2 are therefore used. As illustrated in this view, the housing of the transmission comprises a casing 211 illustrated as if an integrated shell. It will be recognized that the casing can be made in a number of parts bolted together to permit assembly of the transmission. An input shaft 214 enters one side of the main casing 211. An output shaft 216 extends through the lower end of the casing of the power transmission. The output axis is perpendicular to the input axis.

The input shaft 214 is journalled in the main casing by ball bearings 217 or the like. Various other members in the transmission are also mounted by ball bearings indicated schematically in the drawings and, these are not further referred to in this description since conventional in nature.

An input bevel gear 2 18 is fixed on the input shaft 214. The input bevel gear meshes with an outer face on an upper bevel ring gear 219 and an outer gear face on a lower bevel ring gear 221, both of which are coaxial with the output shaft 216. Because of meshing with opposite sides of the input bevel gear, the ring gears are driven in contra-rotation.

The upper bevel gear 219 is secured to or integral with an upper bevel ring gear 222. The upper bevel ring gear 222 meshes with a pair of upper idler gears 223 which also mesh with an upper output gear 224 secured on the output shaft 216. Thus, input torque is coupled from the input shaft to the output shaft by way of the input bevel gear 218, upper bevel gear 219, upper bevel ring gear 222, upper idler gears 223, and upper output gears 224. The idler gears engaging a gear face on the ring gear and a gear face on the output gear perform much the same function as the planetary gears hereinabove described. This type of gearing may permit a more compact configuration of the transmission.

The lower bevel gear 221 is integral with or secured to a lower bevel ring gear 226. The lower bevel ring gear meshes with a pair of lower idler gears 227, which in turn mesh with an intermediate transfer bevel gear 228 coaxial with the output shaft 216. The intermediate transfer bevel gear 228 is secured to a transfer bevel gear 229 by a transfer tube 230. This transfer gear assembly is coaxial with the output shaft 216 and journalled on that shaft for rotation separate from rotation of the output shaft. The intermediate transfer bevel gear is substantially the same as the upper output gear 224.

A lower output bevel gear 231 is secured on the output shaft opposite the transfer bevel gear 229. A pair of common bevel gears 232 mesh with both the transfer bevel gear 229 and the lower output bevel gear 231. The transfer bevel gear and output bevel gear rotate in opposite senses of rotation. This reversal of the sense of rotation via the common bevel gears 232 permits the intermediate transfer gear 228 and the lower output gear 231 to contra-rotate.

Thus, power is also coupled from the input shaft to the output shaft by a second drive train. This drive train comprises, seriatim, the input bevel gear 218, the lower bevel gear 221, the lower bevel ring gear 226, the lower idler gears 227, the intermediate transfer bevel gear 228, the tube 230, the transfer bevel gear 229, the common bevel gears 232, and the lower output bevel gear 231 secured on the output shaft.

A tubular spider 233 is mounted in the housing for pivoting about an axis coaxial with the output shaft. Shafts 234 are mounted in the main body of the spider to provide journals for the upper and lower idler gears 223 and 227. The tubular spider supporting the idler gear shafts 234 and the vertical alignment of the idler gears permits the construction of the transmission with a relatively small outside diameter.

The spider 233 is journalled between the contra-rotating upper and lower bevel ring gears 219 and 212 for pivoting coaxial with the output shaft. The principal purpose of the spider is to provide journalling support for the upper and lower idler gears. The spider assures that the two idler gears precess together relative to the respective bevel ring gears 222 and 226.

A steerable or pivotable sleeve 236 is journalled in the lower part of the casing coaxial with the output shaft. The sleeve 236 comprises a Y-shaped yoke having a pair of gear mounting arms 237. Each of the common bevel gears 232 is mounted on a shaft 239 journalled in a gear mounting arm for rotation about an axis normal to the axis of the output shaft.

The steerable sleeve 236 can be pivoted in either a clockwise or counterclockwise sense relative to the housing independently of rotation of the output shaft. The two drive trains couple the input shaft to the output shaft so that there is no net rotation force on the steerable sleeve due to precession of the spider in coordination with pivoting of the steerable sleeve, and contra-rotation of the two gear drive systems.

If desired, steering of the steerable sleeve can be provided indirectly by forcing precession of the spider. A gear face 241 is formed on the outside of the spider between the ring gears. A steering gear 242 meshes with this gear face for causing pivoting of the spider. The steering gear is pivoted by a steering shaft 243 coupled to the steering gear by a pair of bevel gears 244 so as to enter the housing at an angle to the pivot axis of the spider. Just as rotation of the steering sleeve results in precession of the spider, pivoting of the spider causes concomitant pivoting of the sleeve.

Power input to the transmission can readily be made parallel to the output shaft if desired. Another gear face can be provided on either of the ring gears and driven by a spur or bevel gear on a shaft parallel to the output shaft. In such an embodiment the bevel gear 218 is an idler for transmitting power between the two ring gears. It will also be apparent that in this embodiment, as well as the embodiment illustrated in FIG. 1, an idler bevel gear or gears can be added between the ring gears to balance asymmetrical forces applied by the input bevel gear.

Many other adaptations, modifications and variations of a balance steerable transmission will be apparent. Thus, for example, an output shaft can extend through each end of the transmission. Such an arrangement can be used in a VTOL aircraft such as illustrated in FIG. 5. Alternatively, plural input gears can be employed in engagement with the upper and lower ring gears for providing a plurality of driven "input" shafts from a transmission powered by a driver "output" shaft.

Use of plural planetary gears, reversing gears, idler gears, and the like in each gear system and other changes in the internal gearing will also be apparent. For example, the transfer tube and output shaft, and the steerable sleeve and spider are coaxial in the illustrated embodiments. If desired, bevel gears or the like can be employed in the output shaft and transfer tube for changing the direction the output shaft and steerable sleeve enter the housing.

In the various embodiments described and illustrated, variations of structure have been combined in specific combinations. For example, a bevel gear arrangement and a planetary gear arrangement have been described for the drive trains, a bevel gear arrangement and a reversing spur gear arrangement have been described for the interconnection between the transfer gear and one of the output gears, two different drives between the input shaft and the contra-rotating ring gears have been described, steering is described as external to the transmission, directly on the steerable sleeve and indirectly by driving the spider, and a variety of other features differ between the embodiments. It will be apparent that combinations of such features in addition to those specifically described can readily be made.

Many other modifications and variations will be apparent to one skilled in the art and it is to be understood that the scope of the invention is defined by the following claims.

What is claimed is:

1. A steerable power transmission comprising:
   a stationary housing;
   a rotatable input shaft in the housing;
   a rotatable output shaft in the housing;
   a first output gear on the output shaft;
   a second output gear on the output shaft;
   a steerable sleeve pivotable relative to the housing about an axis coaxial with the output shaft and pivotable relative to both output gears;
   a first drive train comprising a first gear drive coupling the input shaft to the first output gear;
   a second drive train comprising a second gear drive substantially similar to the first gear drive, the second drive train comprising a transfer tube rotatable relative to the steerable sleeve coupling the input shaft to the second output gear; and
   a spider interconnecting portions of the first and second drive trains and mounted for advancing one drive train an amount equal to recession to the other drive train in coordination with pivoting of said steerable sleeve.

2. A steerable transmission as recited in claim 1 wherein the first and second gear drives each comprise a planetary gear drive having a planetary gear coupled to the spider.

3. A steerable transmission as recited in claim 2 wherein such first and second planetary gear drives are coaxial and contra-rotating.

4. A steerable transmission as recited in claim 3 wherein the planetary gear drives each comprise a sun gear, a coaxial ring gear and a planetary gear in engagement with the sun gear and with the ring gear; the first of said sun gears is the first output gear on the output shaft; and the spider interconnects such first and second planetary gears for coordinating precession of such planetary gears.

5. A steerable transmission as recited in claim 4 comprising an input spur gear on the input shaft engaging the first ring gear, and an input reversing spur gear engaging the input spur gear and the second ring gear.

6. A steerable transmission as recited in claim 3 including means on the steerable sleeve for coupling the second planetary gear drive to the second output gear with reversal of the sense of rotation between the second planetary gear drive and the output shaft.

7. A steerable transmission as recited in claim 6 wherein the means for coupling the second planetary gear drive to the second output gear comprises a transfer bevel gear output from the second gear drive, the second output gear comprises a bevel gear substantially the same as the transfer bevel gear, and comprising a common bevel gear meshing with the transfer bevel gear and the second output bevel gear, the common bevel gear being mounted on the steerable sleeve for pivoting with the sleeve and rotatable about an axis normal to the pivot axis of the sleeve.

8. A steerable transmission as recited in claim 7 wherein the means for coupling the secondary planetary gear drive to the output shaft comprises a transfer spur gear face connected to the second sun gear and substantially the same as the face on the second output gear, and comprising a driver spur gear engaging the transfer gear face, and a driven spur gear engaging the driver spur gear and engaging the second output gear.

9. A steerable transmission as recited in claim 1 comprising a transfer bevel gear, and means for coupling the transfer bevel gear to the second output gear with a reversal of the sense of rotation; and wherein the first and second gear drives each comprise a ring gear, a bevel gear face on the ring gear, and at least one idler bevel gear engaging the gear face on the ring gear and rotatable about an axis normal to the output shaft axis; the first output gear being a bevel gear substantially the same as the transfer bevel gear and engaging such a first idler bevel gear, and the second idler bevel gear engaging the transfer bevel gear; the idler bevel gears being mounted on the spider for pivoting with the spider.

10. A steerable transmission as recited in claim 1 comprising means for pivoting the spider for steering the steerable sleeve in coordination therewith.

11. A balanced steerable power transmission comprising:
    a stationary housing;
    an input shaft entering the housing on an input axis;
    an output shaft entering the housing on an output axis;
    a steerable sleeve mounted on the housing for pivoting about an axis coaxial with the output axis;
    a first output gear on the output shaft;
    a first drive train coupling the input shaft to the first output gear;
    a second output gear on the output shaft;
    reversing gear means mounted on the steerable sleeve for rotation relative to the sleeve about an axis perpendicular to the output axis, the reversing gear means being in engagement with the second output gear on the output shaft;
    a second drive train substantially the same as the first drive train coupling the input shaft to the reversing gear means and including transfer gear means coaxial with the output shaft in engagement with the reversing gear means, the transfer gear means including a gear face substantially the same as the first output gear; and
    means interconnecting the first and second drive trains for processing in coordination with pivoting of the steerable yoke so that substantially no net torque is applied to the steerable sleeve by the drive trains regardless of the direction of pivoting of the steerable sleeve.

12. A balanced steerable transmission as recited in claim 11 wherein the first and second drive trains comprise contra-rotating coaxial planetary gear drives and the interconnecting means comprises a spider connecting planetary gears in the first and second planetary gear drives for coordinated precession of such planetary gears around an axis coaxial with the planetary gear drive.

13. A balanced steerable transmission as recited in claim 12 comprising a bevel gear coupling between the input shaft and the planetary gear drive for contra-rotating the planetary gear drives.

14. A balanced steerable transmission as recited in claim 12 wherein the spider advances one planetary gear drive an amount equal to recession of the other planetary gear drive in coordination with pivoting of the steerable sleeve.

15. A balanced steerable transmission as recited in claim 11 comprising a first spur gear coupling the input shaft directly to the first drive train and a second spur gear coupling the first spur gear to the second drive train for contra-rotating the first and second drive trains.

16. A balanced steerable transmission as recited in claim 11 wherein the first drive train comprises a first ring gear including a bevel gear face and a first idler bevel gear engaging the bevel gear face and the first output gear; the second drive train comprises a second ring gear including a bevel gear face and a second idler bevel gear engaging the bevel gear face on the second ring gear and the transfer gear means; and the input shaft drives the ring gears in opposite senses of rotation.

17. A balanced steerable power transmission comprising;
   a stationary housing;
   a rotatable input shaft entering the housing;
   a rotatable output shaft entering the housing;
   a first output gear on the output shaft;
   a second output gear on the output shaft;
   a first planetary gear drive train coupling the input shaft to the first output gear;
   a transfer tube coaxial with the output shaft;
   a second planetary gear drive train substantially the same as the first gear drive train coupling the input shaft to the transfer tube with a sense of rotation opposite to the output shaft;
   a steerable sleeve entering the housing coaxial with the output shaft, and pivotable relative to both output gears and relative to the transfer tube;
   gear means on the steerable sleeve coupling the transfer tube to the second output gear with a reversed sense of rotation;
   a spider mounted in the housing for pivoting coaxial with the steerable sleeve in coordination with pivoting of the steerable sleeve; and
   means coupling the spider to planetary gears in both the first drive train and second drive train for advancing a planetary gear in the first drive train an amount equal to recession of a planetary gear in the other drive train in coordination with pivoting of the steerable sleeve.

18. A balanced steerable transmission as recited in claim 17 wherein each planetary gear drive train comprises a ring gear and comprising means coupled to the input shaft for driving the first ring gear in a first sense of rotation and for driving the second ring gear in a second sense of rotation.

19. A balanced steerable transmission as recited in claim 18 wherein the means for driving the ring gears comprises an input spur gear on the input shaft engaging the first ring gear and an input reversing spur gear engaging the input spur gear and engaging the second ring gear.

20. A balanced steerable power transmission comprising;
   a stationary housing;
   a rotatable input shaft entering the housing;
   a rotatable output shaft entering the housing;
   a first output gear on the output shaft;
   a second output gear on the output shaft;
   a first planetary gear drive train coupling the input shaft to the first output gear;
   a transfer tube coaxial with the output shaft;
   a second planetary gear drive train substantially the same as the first gear drive train coupling the input shaft to the transfer tube with a sense of rotation opposite to the output shaft;
   a steerable sleeve entering the housing coaxial with the output shaft and pivotable relative to both output gears;
   gear means on the steerable sleeve coupling the transfer tube to the second output gear with a reversed sense of rotation comprising;
   a transfer spur gear face on the transfer tube substantially the same as the face on the second output gear comprising:
      a driver spur gear engaging the transfer gear face; and
      a driven spur gear engaging the driver spur gear and engaging the second output gear;
   a spider mounted in the housing for pivoting coaxial with the steerable sleeve in coordination with pivoting of the steerable sleeve; and
   means coupling the spider to planetary gears in both the first drive train and second drive train for advancing a planetary gear in the first drive train an amount equal to recession of a planetary gear in the other drive train in coordination with pivoting of the steerable sleeve.

21. A balanced steerable power transmission comprising:
   a stationary housing;
   first and second ring gears in the housing coaxial with the output shaft;
   means connected to the input shaft for driving the ring gears in opposite directions;
   a rotatable input shaft entering the housing;
   a rotatable output shaft entering the housing;
   a first output gear on the output shaft;
   a second output gear on the output shaft;
   a steerable sleeve entering the housing coaxial with the output shaft and pivotable relative to the housing;
   a spider mounted in the housing coaxial with the output shaft and pivotable relative to the housing;
   first gear means mounted on the spider for precession therewith for transmitting power from the first ring gear to the first output gear;
   transfer gear means coaxial with the output shaft and having a gear face substantially the same as the first output gear;
   second gear means mounted on the spider for precession therewith for transmitting power from the second ring gear to the transfer gear means; and
   reversing means on the steerable sleeve connected between the transfer gear means and the second output gear for transmitting power from the transfer gear means to the second output gear with an opposite sense of rotation from the transfer gear means.

22. A balanced steerable power transmission as recited in claim 21 wherein the means for driving the ring gears comprises an input spur gear on the input shaft engaging the first ring gear, and an input reversing spur gear engaging the input spur gear on the second ring gear.

23. A balanced steerable power transmission as recited in claim 21 comprising:
   a transfer spur gear face substantially the same as the face on the second output gear;

a transfer tube interconnecting the gear face on the transfer gear means and the transfer spur gear face; and wherein the reversing means on the steerable sleeve comprises:

a driver spur gear engaging the transfer gear face; and a driven spur gear engaging the driver spur gear and engaging the second output gear.

24. A balanced steerable power transmission as recited in claim 21 comprising means for pivoting the spider for steering the steerable sleeve in coordination therewith.

25. A steerable transmission comprising:
a stationary housing;
a rotatable input shaft entering the housing;
a rotatable output shaft entering the housing;
a first output gear secured to the output shaft;
a first ring gear coaxial with the first output gear;
at least one planetary gear interconnecting the first ring gear and the first output gear;
a transfer tube coaxial with the output shaft and including a transfer sun gear face similar to the face on the first output gear;
a second ring gear coaxial with the transfer sun gear face;
at least one planetary gear interconnecting the second ring gear and the transfer sun gear face;
an input spur gear on the input shaft for driving the first ring gear;
an input reversing spur gear engaging the input spur gear and the second gear for driving the second ring gear in the opposite sense of rotation from the first ring gear;
a spider mounted in the housing for pivoting coaxial with the output shaft;
means for mounting the planetary gears on the spider for pivoting therewith and for rotation around the planetary gear axes;
a transfer gear face on the transfer tube;
a second output gear secured to the output shaft having a gear face substantially the same as the transfer gear face;
at least one reversing gear means interconnecting the transfer gear face and the second output gear for driving the second output gear in the same sense of rotation as the first output gear;
a steerable sleeve entering the housing and pivotable coaxial with the output shaft; and
means for mounting the reversing gear means on the steerable sleeve for pivoting therewith and for rotation around the reversing gear axes.

26. A steerable transmission as recited in claim 25 wherein the reversing gear means comprises a driver spur gear engaging the transfer gear face, and a driven spur gear engaging the driver spur gear and engaging the second output gear.

27. A steerable transmission as recited in claim 25 comprising a gear face on the steering sleeve and a steering gear meshing with the gear face for pivoting the steering sleeve.

28. A steerable transmission comprising:
a stationary housing;
a rotatable input shaft entering the housing;
a rotatable output shaft entering the housing;
a first output bevel gear secured to the output shaft;
a second output bevel gear secured to the output shaft;
a first ring gear coaxial with the first output gear and including a bevel gear face;
at least one idler bevel gear interconnecting the bevel gear face on the first ring gear and the first output bevel gear;
a transfer tube coaxial with the output shaft and including a transfer bevel gear face substantially the same as the face on the first output gear;
a second ring gear coaxial with the transfer sun gear face and including a bevel gear face;
at least one idler bevel gear interconnecting the bevel gear face on the second ring gear and the transfer bevel gear face;
means connected to the input shaft for driving the first and second ring gears with opposite sense of rotation;
a spider mounted in the housing for pivoting coaxial with the output shaft;
means for mounting the idler bevel gears on the spider for pivoting therewith and for rotation around the idler bevel gear axes;
a transfer gear face on the transfer tube;
at least one reversing gear means interconnecting the transfer gear face and the second output gear for driving the second output gear in the same sense of rotation as the first output gear;
a steerable sleeve entering the housing and pivotable coaxial with the output shaft; and
means for mounting the reversing gear means on the steerable sleeve for pivoting therewith and for rotation around the reversing gear axes.

29. A steerable transmission as recited in claim 28 wherein the transfer gear face is a bevel gear, the second output gear is a bevel gear, and the reversing gear means comprises at least one common bevel gear meshing with the transfer bevel gear face and the second output gear.

30. A steerable transmission as recited in claim 28 wherein the means for driving the ring gears comprises a bevel gear on the output shaft engaging both the first and second ring gears.

31. A steerable transmission as recited in claim 28 comprising a gear face on the spider and a steering gear meshing with the gear face for pivoting the spider.

* * * * *

UNITED STATES PATENT AND TRADEMARK OFFICE
CERTIFICATE OF CORRECTION

PATENT NO.  : 4,726,257

DATED       : February 23, 1988

INVENTOR(S) : DONALD F. NELSON

It is certified that error appears in the above-identified patent and that said Letters Patent is hereby corrected as shown below:

```
Column  2, line 10, before "net" change "not" to -- no --;
Column  3, line 36, after "journalled" and before "to"
          insert -- on that shaft for rotation in a
          direction opposite --;
Column  5, line 23, change "tansmission" to -- transmission --;
Column  7, line 6, change "aide" to -- aid --;
Column  7, lines 23, 24, before "which in turn" delete the
          preceding phrase "which in turn mesh with a pair
          of lower planetary gears 127,";
Column  9, line 9, change "2 18" to -- 218 --;
Column 12, line 49, change "processing" to -- precessing --.
```

Signed and Sealed this

Fourth Day of October, 1988

*Attest:*

DONALD J. QUIGG

*Attesting Officer*   *Commissioner of Patents and Trademarks*